United States Patent [19]

Tanaka et al.

[11] Patent Number: 4,602,805
[45] Date of Patent: Jul. 29, 1986

[54] VEHICLE SUSPENSION APPARATUS

[75] Inventors: Tadao Tanaka, Okazaki; Sunao Chikamori, Nagoya; Mitsuhiko Harara, Okazaki; Yasutaka Taniguchi; Masanaga Suzumura, both of Nagoya; Minoru Tatemoto, Okazaki; Naotake Kumagai, Aichi; Hiroki Abe, Okazaki, all of Japan

[73] Assignee: Mitsubishi Jidosha Kogyo Kabushiki Kaisha, Tokyo, Japan

[21] Appl. No.: 727,376

[22] Filed: Apr. 25, 1985

[30] Foreign Application Priority Data

| Apr. 25, 1984 | [JP] | Japan | 59-83351 |
| Apr. 27, 1984 | [JP] | Japan | 59-83865 |
| Apr. 28, 1984 | [JP] | Japan | 59-63113[U] |
| Sep. 29, 1984 | [JP] | Japan | 59-204606 |
| Oct. 9, 1984 | [JP] | Japan | 59-211635 |
| Oct. 9, 1984 | [JP] | Japan | 59-211636 |

[51] Int. Cl.$^4$ .................. B60G 11/26; B60G 17/00
[52] U.S. Cl. .................. 280/707; 280/6 R; 280/708
[58] Field of Search ............... 280/707, 708, 688, 689, 280/703, 711, 6 R; 267/64.16

[56] References Cited

U.S. PATENT DOCUMENTS

| 4,326,733 | 4/1982 | Rubalcava | 280/708 |
| 4,377,299 | 3/1983 | Fujii | 280/708 |
| 4,453,725 | 6/1984 | Kuwawa et al. | 280/708 |
| 4,466,625 | 8/1984 | Kondo et al. | 280/707 |
| 4,468,050 | 8/1984 | Woods et al. | 280/707 |
| 4,546,960 | 10/1985 | Abrams et al. | 280/707 |
| 4,564,214 | 1/1986 | Tokunaga et al. | 280/708 |

FOREIGN PATENT DOCUMENTS 53-26021 10/1978 Japan.
58-30541 2/1983 Japan.
58-30819 2/1983 Japan.

Primary Examiner—Richard A. Bertsch
Attorney, Agent, or Firm—Frishauf, Holtz, Goodman & Woodward

[57] ABSTRACT

The front wheel exhaust valves and the rear wheel supply valves are opened for a predetermined period of time when rapid acceleration of the vehicle is detected by the accelerator pedal sensor and the gear position sensor, the absolute value of change in vehicle position and its velocity can be properly controlled. Therefore, comfort and steering stability can be improved as compared with vehicles mounting of the conventional apparatus. In addition, since an acceleration state is detected by the gear position sensor as well as the accelerator pedal sensor, rapid acceleration of the vehicle can be accurately detected, thereby preventing unnecessary position control.

25 Claims, 18 Drawing Figures

FIG. 2

| VALVE NO. | 32 | 223 | 273 | 224 | 274 | 242 | 221 | 271 | 222 | 272 | 241 | 30 |
|---|---|---|---|---|---|---|---|---|---|---|---|---|
| MODE \ NAME | SELECTION OF EX. PATH | FL SUP. | FL EX. | FR SUP. | FR EX. | FR & FL COMMUNICATE | RL SUP. | RL EX. | RR SUP. | RR EX. | RR & RL COMMUNICATE | SELECTION OF SUP. PATH |
| NORMAL | × | × | × | × | × | ○ | × | × | × | × | ○ | × |
| HEIGHT CONT. — F UP | × | ○ | × | ○ | × | ○ | × | × | × | × | ○ | × |
| HEIGHT CONT. — R UP | × | × | × | × | × | ○ | ○ | × | ○ | × | ○ | × |
| HEIGHT CONT. — F&R UP | × | ○ | × | ○ | × | ○ | ○ | × | ○ | × | ○ | × |
| HEIGHT CONT. — F DOWN | × | × | ○ | × | ○ | ○ | × | × | × | × | ○ | × |
| HEIGHT CONT. — R DOWN | × | × | × | × | × | ○ | × | ○ | × | ○ | ○ | × |
| HEIGHT CONT. — F&R DOWN | × | × | ○ | × | ○ | ○ | × | ○ | × | ○ | ○ | × |
| L.ROLL CONT. — START | ○ | ○ | × | × | ○ | × | ○ | × | × | ○ | × | ○ |
| L.ROLL CONT. — HOLD | ○ | × | × | × | × | × | × | × | × | × | × | ○ |
| L.ROLL CONT. — RETURN | × | × | × | × | × | ○ | × | × | × | × | ○ | × |
| R.ROLL CONT. — START | ○ | × | ○ | ○ | × | × | × | ○ | ○ | × | × | ○ |
| R.ROLL CONT. — HOLD | ○ | × | × | × | × | × | × | × | × | × | × | ○ |
| R.ROLL CONT. — RETURN | × | × | × | × | × | ○ | × | × | × | × | ○ | × |
| NOSE DIVE CONT. — START | ○ | ○ | × | ○ | × | × | × | ○ | × | ○ | × | ○ |
| NOSE DIVE CONT. — HOLD | ○ | × | × | × | × | × | × | × | × | × | × | ○ |
| NOSE DIVE CONT. — RETURN | ○ | × | ○ | × | ○ | × | ○ | × | ○ | × | × | ○ |
| SQUAT CONT. — START | ○ | × | ○ | × | ○ | × | ○ | × | ○ | × | × | ○ |
| SQUAT CONT. — HOLD | ○ | × | × | × | × | × | × | × | × | × | × | ○ |
| SQUAT CONT. — RETURN | ○ | ○ | × | ○ | × | × | × | ○ | × | ○ | × | ○ |

F I G. 3A 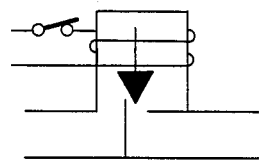   F I G. 3B 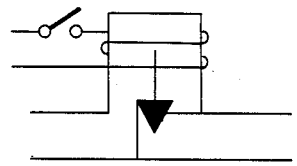
F I G. 4
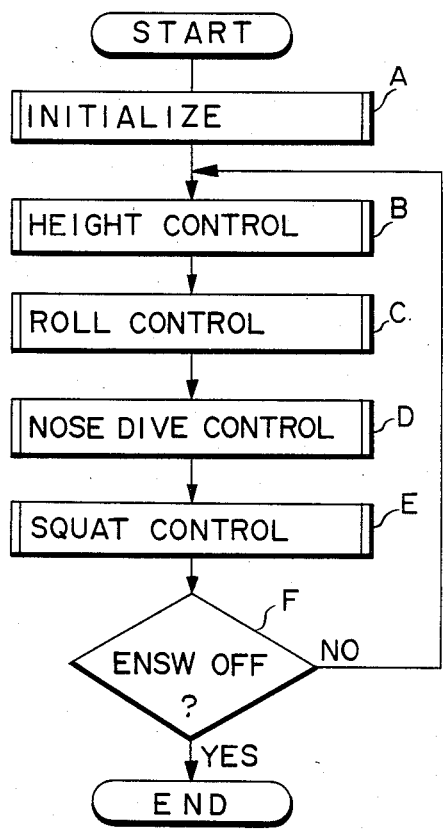

F I G. 13

| ACCELERATOR OPENING VELOCITY Va(m/sec) | VALVE CONTROL TIME Tp(sec) |
|---|---|
| $0 \leq |va| < |va_1|$ | 0 |
| $|va_1| \leq |va| < |va_2|$ | T1 |
| $|va_2| \leq |va| < |va_3|$ | T2 |
| $|va_3| \leq |va|$ | T3 |

VEHICLE SUSPENSION APPARATUS

BACKGROUND OF THE INVENTION

The present invention relates to a vehicle suspension apparatus for controlling a change in position of a vehicle along its longitudinal direction when the vehicle is rapidly accelerated.

In general, a shock absorber having a damping shock absorber and a spring is inserted between the vehicle body and each wheel. Such a suspension apparatus is provided for each of the front and rear wheels. The spring supports the vehicle weight and mainly absorbs a static input, while the shock absorber mainly absorbs a dynamic input. The shock absorber further protects the vehicle body from vibration near a neutral vehicle height position by an external force.

However, in this suspension apparatus, when a continuous load acts on the rear wheels as the vehicle is rapidly accelerated, the rear portion of the vehicle body is moved downward while the front portion thereof is moved upward. When acceleration is decreased, the front portion is moved downward while the rear portion is moved upward, thereby discomforting the driver and passengers and degrading driving stability.

In view of problem, another conventional shock absorber with a damping force switching mechanism is known. When the vehicle is rapidly accelerated, the damping force of the shock absorber is increased to decrease a change in vehicle position.

In the above shock absorber, a speed of change in vehicle position can be decreased upon rapid acceleration of the vehicle, even if the damping force of the shock absorber is increased. However, the absolute value of the change in vehicle position cannot be decreased if an acceleration state is kept for a long period of time, thus failing to provide a satisfactory effect.

SUMMARY OF THE INVENTION

It is an object of the present invention to provide a vehicle suspension apparatus wherein a change in a vehicle position during rapid acceleration can be properly controlled to greatly improve steering stability and riding comfort.

According to the present invention, there is provided a vehicle suspension apparatus comprising: front and rear wheel suspension units arranged at wheel positions and having fluid spring chambers, respectively; fluid supply means for supplying a fluid to the fluid spring chambers in the front and rear wheel suspension units, respectively, through front and rear wheel fluid supply valves; fluid exhaust means for exhausting the fluid from the fluid spring chambers in the front and rear wheel suspension units, respectively, through front and rear wheel fluid exhaust valves; position control means for controlling the front and rear wheel fluid supply valves and the front and rear wheel fluid exhaust valves; an accelerator pedal sensor for detecting a state of an accelerator pedal of a vehicle engine and supplying a detection signal to the position control means; and a gear position sensor for detecting a gear change position of a reduction gear of a vehicle and supplying a detection signal to the position control means, wherein the position control means opens the front wheel fluid exhaust valves and the rear wheel fluid supply valves for a predetermined period of time when a rapid acceleration of the vehicle is detected by the accelerator pedal sensor and the gear position sensor.

According to the present invention, since the front wheel exhaust valves and the rear wheel supply valves are opened for a predetermined period of time when rapid acceleration of the vehicle is detected, the absolute value of change in vehicle position and its velocity can be properly controlled. Therefore, comfort and steering stability can be improved as compared with vehicles mounting of the conventional apparatus. In addition, since an acceleration state is detected by the gear position sensor as well as the accelerator pedal sensor, rapid acceleration of the vehicle can be accurately detected, thereby preventing unnecessary position control.

BRIEF DESCRIPTION OF THE DRAWINGS

FIG. 2 is a table showing the opening/closing states in the respective modes of the valves shown in FIG. 1;

FIG. 3A is a diagram for explaining the ON state of each valve shown in FIG. 1;

FIG. 3B is a diagram for explaining the OFF state of each valve shown in FIG. 1;

FIG. 4 is a flow chart for explaining the main control flow of the apparatus shown in FIG. 1;

FIG. 13 is a table showing the accelerator pedal depression velocity map;

DETAILED DESCRIPTION OF THE PREFERRED EMBODIMENTS

The present invention will be described in detail with reference to the preferred embodiments in conjunction with the accompanying drawings.

Figure 1:
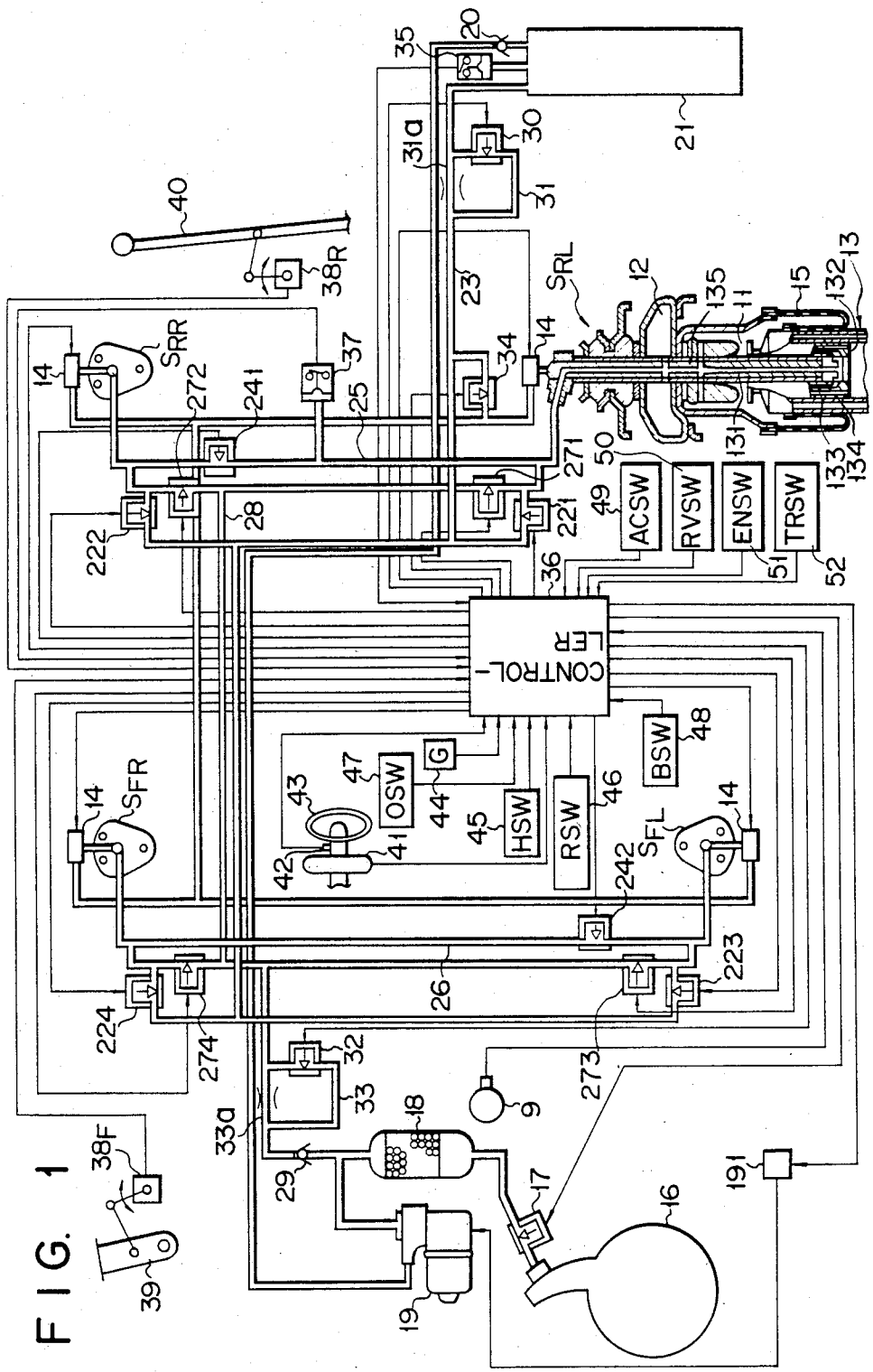
FIG. 1 is a suspension apparatus according to the present invention.

FIG. 1 shows the overall configuration of a suspension apparatus according to the present invention. Reference numeral $S_{FR}$ denotes a front right wheel suspension unit; $S_{FL}$, a front left wheel suspension unit; $S_{RR}$, a rear right wheel suspension unit; and $S_{RL}$, a rear left wheel suspension unit. The units $S_{FR}$, $S_{FL}$, $S_{RR}$ and $S_{RL}$ have an identical structure and are exemplifeid by the unit $S_{RL}$. The unit $S_{RL}$ comprises an air spring 10 consisting of a main air spring chamber 11 and an auxiliary air spring chamber 12, a shock absorber 13 and a oil spring (not shown) used as an auxiliary spring. The shock absorber 13 provides a damping force, which is switched between hard and soft by a pneumatic switch unit (actuator) 14. The switch unit 14 opens and closes a passage 133 formed in a piston 132 of the shock absorber 13 by turning a control rod 131 about an axis thereof. In this way, the area of the passage communicating two chambers defined in the shock absorber 13 by the piston 132 is controlled to switch the damping force of the shock absorber 13 between hard and soft. Reference numeral 134 designates a passage formed in the piston 132, through which passage the two chambers in the shock absorber 13 are communicated with each other at all time. Reference numeral 15 denotes a bellows which defines the main air spring chamber. The unit 14 controls communication/noncommunication between the chambers 11 and 12, thereby selecting the hard or soft damping mode. The unit 14 is controlled by controller 36 having a microcomputer.

Reference numeral 16 denotes an air cleaner. Air received through the cleaner 16 is supplied to a drier 18 through an atmospheric air sealing solenoid valve 17. Air dried by the drier 18 is compressed by a compressor 19 and stored in a reserve tank 21 through a check valve 20. Reference numeral 191 denotes a compressor relay which is controlled by the controller 36.

The tank 21 is connected to the main and auxiliary air spring chambers 11 and 12 in the units $S_{RL}$ to $S_{FL}$ through an air intake pipe 23 having air supply solenoid valves 221 to 224 respectively corresponding to the front and rear wheel suspension units. The chambers 11 and 12 in the units $S_{RL}$ and $S_{RR}$ are coupled to each other through a communicating pipe 25 having a communicating solenoid valve 241. The chambers 11 and 12 in the units $S_{FL}$ and $S_{FR}$ are coupled to each other through a communicating pipe 26 having a communicating solenoid valve 242. The compressed air in the chambers 11 and 12 in the units $S_{RL}$ to $S_{FL}$ is exhausted through an exhaust pipe 28 with exhaust solenoid valves 271 to 274, a check valve 29, the drier 18, the valve 17 and the cleaner 16.

A pipe 31 having an air intake channel selection solenoid valve 30 is arranged in parallel with the pipe 23. When the valve 30 is closed, the compressed air is supplied from the tank 21 to the respective suspension units through only a small-diameter path 31a. However, when the valve 30 is opened, the compressed air is supplied from the tank 21 to the respective suspension units through the path 31a and the large-diameter path 31. A pipe 33 having an exhaust channel selection solenoid valve 32 is arranged in parallel with the pipe 28. When the valve 32 is closed, the compressed air is exhausted from the respective suspension units to the drier 18 through a small-diameter path 33a. However, when the valve 32 is opened, the compressed air is exhausted through the path 33a and the large-diameter path 33.

A hard/soft selection solenoid valve 34 is inserted between the pipe 23 and the unit 14. The valve 34 is controlled in response to a signal from the controller 36. A pressure of the tank 21 is detected by a pressure switch 35. A detection signal from the switch 35 is supplied to the controller 36. Reference numeral 37 denotes a pressure sensor for detecting internal pressures of the chambers 11 and 12 of the rear suspension units $S_{RL}$ and $S_{RR}$. A detection signal from the sensor 37 is supplied to the controller 36.

Reference numeral 38F denotes a front vehicle height sensor mounted between a front right lower arm 39 and the vehicle body to detect a vehicle height at the front portion of the body. Reference numeral 38R denotes a rear vehicle height sensor mounted between a rear left lateral rod 40 and the vehicle body to detect a vehicle height at the rear portion of the body. Vehicle height signals from the sensors 38F and 38R are supplied to the controller 36. Each of these sensors 38F and 38R comprises an IC element and a magnet, one of which is mounted on the wheel side and the other of which is mounted on the body side so as to detect the distance between the current level and a normal, high or low vehicle height level. The vehicle height sensors can be of another type, e.g., a photointerruptor type.

Reference numeral 41 denotes a vehicle velocity sensor for detecting a vehicle velocity; 42, a steering state sensor for detecting a steering angle and a steering angular velocity of a steering wheel 43; and 44, an acceleration sensor for detecting back-and-forth, right-and-left and vertical acceleration. The sensor 44 can be of a type wherein a weight is suspended and a shielding plate interlocked with the weight shields light from a light-emitting diode so as to prevent light from reaching a photodiode when no acceleration acts, and an acceleration is detected when the weight is inclined or moved so as to cause light from the light-emitting diode to reach the photodiode. Detection signals from the sensors 41, 42 and 44 are supplied to the controller 36.

Reference numeral 45 denotes a vehicle height selection switch (HSW) for setting a target vehicle height to a high vehicle height (HIGH), a low vehicle height (LOW) or an automatic vehicle height (AUTO). Reference numeral 46 denotes a position control selection switch (RSW) for controlling position control so as to decrease rolling of the vehicle. Reference numeral 47 denotes a hydraulic sensor (OSW) for detecting a hydraulic pressure of engine lubricant; 48, a brake sensor (BSW) for detecting a depression angle of a brake pedal; 49, an accelerator pedal sensor (ACSW) for detecting a depression state of the accelerator pedal; 50, an engine speed sensor (RVSW) for detecting an engine speed; 51, an engine switch (ENSW) such as an ignition switch for starting the engine; and 52, a gear position sensor (TRSW) for detecting a gear position of a transmission. Output signals from the switches 45, 46 and 51 and detection signals from the sensors 47, 48, 49 and 50 are supplied to the controller 36.

The valves 17, 221 to 224, 271 to 274, 30 and 34 comprise normally closed valves, respectively; and the valves 241 and 242 comprise normally open valves, respectively.

The controller 36 compares the target vehicle heights set by the switch 45 with the vehicle heights detected by the sensors 38F and 38R, and controls the respective solenoid valves so that the actual vehicle heights coincide with the target vehicle heights, respectively, thereby performing vehicle height control.

The position control function can be performed as follows. The controller 36 detects a change in vehicle position and its direction in accordance with the outputs from the corresponding sensors and controls the corresponding solenoid valves so as to cancel the change in vehicle position.

When vehicle height control described above is to be performed, the valves 30 and 32 are closed to slowly change the vehicle height so as to eliminate discomfort to the driver and passengers. When position control described above is to be performed, the valves 30 and 32 are opened to cancel influence of a rapid position change.

The opening/closing states of the respective valves will be described with reference to FIGS. 2 to 3B when the above-mentioned vehicle height and position control operations are performed.

FIG. 2 shows the opening/closing states of the respective valves (FIG. 1) in the respective modes. Circles represent the ON state; and crosses represent the OFF state. As shown in FIGS. 3A and 3B, each solenoid valve is opened when it is energized (ON); and closed when it is deenergized (OFF).

The respective modes will be described with reference to FIG. 1 in the order named in the table of FIG. 2.

In the normal mode, only the valves 242 and 241 are opened, so that the air springs 10 in the right and left suspension units communicate with each other. In this state, since the volume of each air spring 10 is substantially increased, the spring constant is decreased to improve comfortability.

In the vehicle height control mode, vehicle height signals detected by the sensors 38F and 38R are compared with the target vehicle heights set by the switch 45, respectively. In order to increase the vehicle height, the corresponding supply solenoid valves are opened. However, in order to decrease the vehicle height, the corresponding exhaust solenoid valves are opened. In the vehicle height control mode, the valves 242 and 241 are opened to maintain comfort. The valves 30 and 32 are closed in the height control mode. Therefore, height control is performed slowly to maintain comfort of the driver and passengers.

Rolling control comprises a start mode, a holding mode and a return mode. In the start mode, the compresed air is supplied to the air spring 10 which is moved downward along the right-and-left direction of the vehicle, and the compressed air is exhausted from the spring 10 which is moved upward. In the holding mode, the state obtained in the start mode is held. In the restoration mode, the right air spring 10 is kept at the same pressure as that of the left air spring 10 when rolling is eliminated. More particularly, in the start mode, the associated air supply solenoid valves and the associated air exhaust solenoid valves are opened for a predetermined period of time, and at the same time, the valves 30 and 32 are opened quickly to perform the position control operation. In the holding mode, only the channel selection solenoid valves are kept opened. Under this condition, when a lateral acceleration acting on the vehicle during turning is increased, the compressed air must be additionally supplied to and exhausted from the corresponding air springs 10. Such additional supply and exhaust of the compressed air can be quickly performed. In the return mode, only the valves 241 and 242 are opened to restore the same state as in the normal mode.

Braking control (nose dive control) also comprises a start mode, a holding mode and a return mode. In the start mode, the compressed air is supplied to the front air springs 10 in a predetermined volume, and at the same time, the compressed air is exhausted from the rear air springs 10 in a predetermined volume. In the holding mode, the state obtained in the start mode is maintained. In the return mode, the compressed air is exhausted from the front air springs 10 in a predetermined volume, and at the same time the compressed air is supplied to the rear air springs 10 in a predetermined volume. More particularly, in the start mode, the valves 223, 224, 271 and 272 are opened for a predetermined period of time and at the same time, the respective channel selection solenoid valves are opened. In the holding mode, only the front and rear channel selection solenoid valves are opened in the same manner as for roll control. In the return mode, the valves 273, 274, 221 and 222 are opened, and at the same time the valves 30 and 32 are kept opened.

Acceleration control (squat control) also comprises a start mode, a holding mode and a return mode. In the start mode, the compressed air is exhausted from the front air springs 10 in a predetermined volume and is supplied to the rear air springs 10 in a predetermined volume. In the holding mode, the state obtained in the start mode is held. In the return mode, the compressed air is exhausted from the rear air springs 10 and is supplied to the front air springs 10 in a predetermined volume. More particularly, in the start mode, the valves 273, 274, 221 and 222 are opened and at the same time the valves 30 and 32 are opened for a predetermined period of time. In the holding mode, the valves 30 and 32 are kept open in the same manner as in roll control. In the return mode, the compressed air is exhausted from the valves 223 and 224 and is supplied to the valves 271 and 272 for a predetermined period of time and the valves 30 and 32 are kept opened.

The respective modes shown in FIG. 2 are controlled in accordance with the flow chart of FIG. 4 which is controlled by the controller 36.

Referring to FIG. 4, the flow is started when the engine switch is turned on. In step A, the respective memories for storing various data and flags are initialized. In steps B, C, D and E, height control, roll control, nose dive control, and squat control are performed respectively. The controller 36 checks in step F whether or not the ignition switch is turned off. If NO in step F, the flow returns to step B. However, if YES in step F, the control operation is completed.

The height control flow (step B) serves to control predetermined modes thereof shown in FIG. 1 in accordance with the height detection signals from the sensors 38F and 38R and a signal from the switch 45.

The roll control flow (step C) serves to control the predetermined modes thereof shown in FIG. 2 by predicting or detecting a lateral acceleration acting on the vehicle body by using the output signals from the sensors 41, 42 and 44.

The nose dive control flow (step D) serves to control the predetermined modes thereof shown in FIG. 2 by predicting or detecting an acceleration along the longitudinal direction of the vehicle in accordance with the outputs from the sensors 44 and 48.

The squat control flow (step E) serves to control the predetermined modes thereof shown in FIG. 2 by predicting or detecting the acceleration along the longitudinal direction of the vehicle in accordance with the outputs from the sensors 49, 52 and 41.

The squat control flow (step E) will be described in detail with reference to FIGS. 5 to 16.

Figure 5:
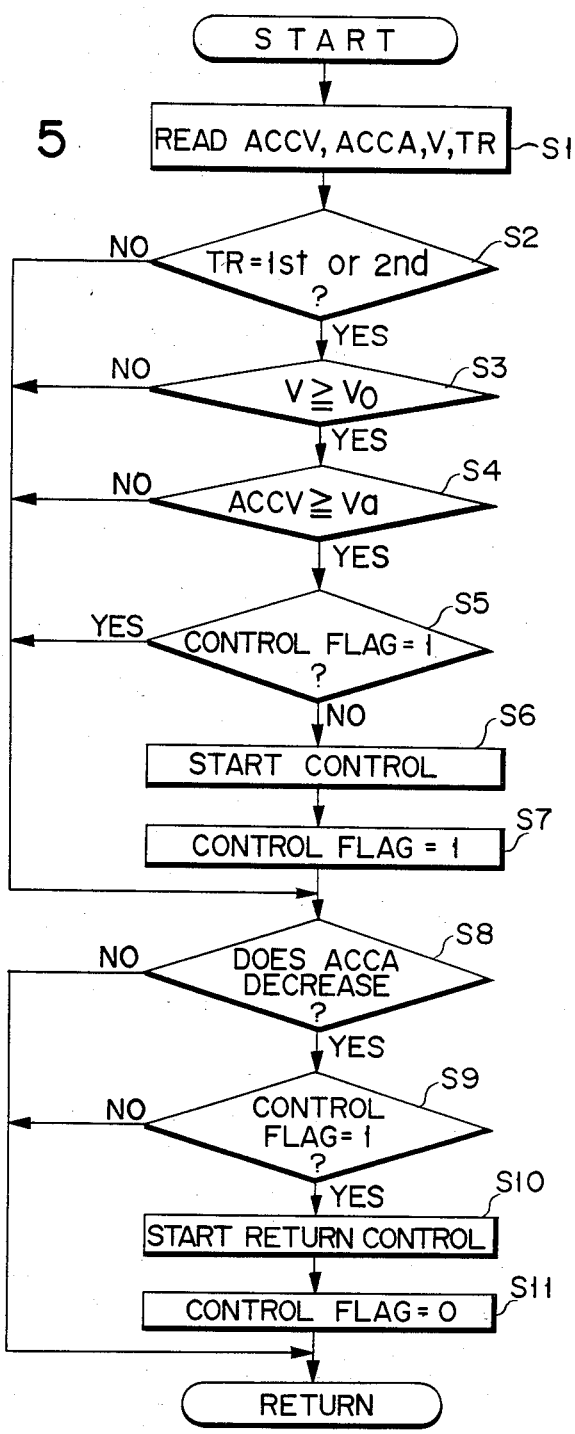
FIG. 5 is a flow chart for explaining the operation of a first embodiment of the present invention.

FIG. 5 is a flow chart for explaining a first embodiment of the present invention. In step S1, data are fetched by the controller 36 from the sensors 49, 52 and 41 to derive a rate of change in accelerator pedal depression velocity ACCV, a vehicle velocity V and a gear position TR which are stored in the memory. In step S2, the controller 36 checks whether or not the gear position is a low-speed gear position such as the first gear position or the second gear position. If NO in step S2, the flow advances to step S8. This is because no position control need be performed since a relatively large acceleration along the longitudinal direction does not act on the vehicle if the gear position is not a low gear position such as the first or second gear position. However, if YES in step S2, the flow advances to step S3.

The controller 36 checks in step S3 whether or not the vehicle velocity is higher than V0 km/h (e.g., 3 km/h). If NO in step S3, the flow advances to step S8. This is because the driver may depress the accelerator pedal while the clutch is disconnected even if the shift lever is set in the first gear position. As a result, position control would be inconveniently started although a change in position of the vehicle body does not occur. In order to prevent such inconvenience, step S3 is performed. If YES in step S3, the flow advances to step S4.

The controller 36 checks in step S4 whether or not the accelerator pedal depression velocity is higher than Va m/s (e.g., 0.2 m/s). If NO in step S4, the flow advances to step S8. When the accelerator pedal depression velocity is as small as, for example, 0.2 m/s, no large acceleration along the longitudinal direction of the vehicle will be generated. In this case, no position control need be performed. The accelerator pedal depression velocity in step S4 varies in accordance with the type of vehicle and the delay time of each solenoid valve. Therefore, the accelerator pedal depression velocity is properly selected so as to match the timing at which maximum acceleration acts on the vehicle body and the timing at which a restoration force acts on the body in position control.

If YES in step S4, a large acceleration acts along the longitudinal direction of the vehicle body, and the vehicle body is inclined to be squatted. In order to start squat control, the flow advances to step S5. The controller 36 checks in step S5 whether or not the control flag is set at logic "1". Although the control flag will be described in detail later, the control flag of logic "1" represents that squat control is not yet restored. Otherwise, squat control is not yet started or is already restored. If YES in step S5, the flow advances to step S8. However, if NO in step S5, the flow advances to step S6 wherein the squat control is started.

A control start instruction is generated in step S6, and the valves 30 and 32 are opened. At the same time, the valves 273, 274, 221 and 222 are opened for a predetermined period of time (e.g., 0.15 sec). The valves 273, 274, 221 and 222 are then closed. In step S7, the control flag is set at logic "1".

The controller 36 determines in step S8 that a rate of change in accelerator pedal depression velocity is decreased. In other words, the controller 36 checks whether or not control operation is restored from the holding mode of squat control. If NO in step S8, the subsequent steps are omitted, and the flow returns to step S1. If YES in step S8, restoration control must be performed. The controller 36 then checks in step S9 whether or not the control is set in the holding mode, i.e., the control flag is set at logic "1".

If YES in step S9, a control restoration instruction is generated in step S10, and the controller 36 confirms that the valves 30 and 32 are closed. The controller 36 then opens the valves 223, 224, 271 and 272 for a predetermined period of time. Thereafter, the valves 223, 224, 271 and 272 and the valves 30 and 32 are closed. In step S11, the control flag is set at logic "0" in response to the instruction in step S10. If NO in step S9, the restoration mode need not be set. Therefore, the operations in steps S10 and S11 are omitted, and the flow returns to step S1.

The flow chart described above will be described in accordance with the accelerator pedal depression pattern with reference to FIG. 6. This pattern is obtained for starting of the vehicle.

Figure 6:
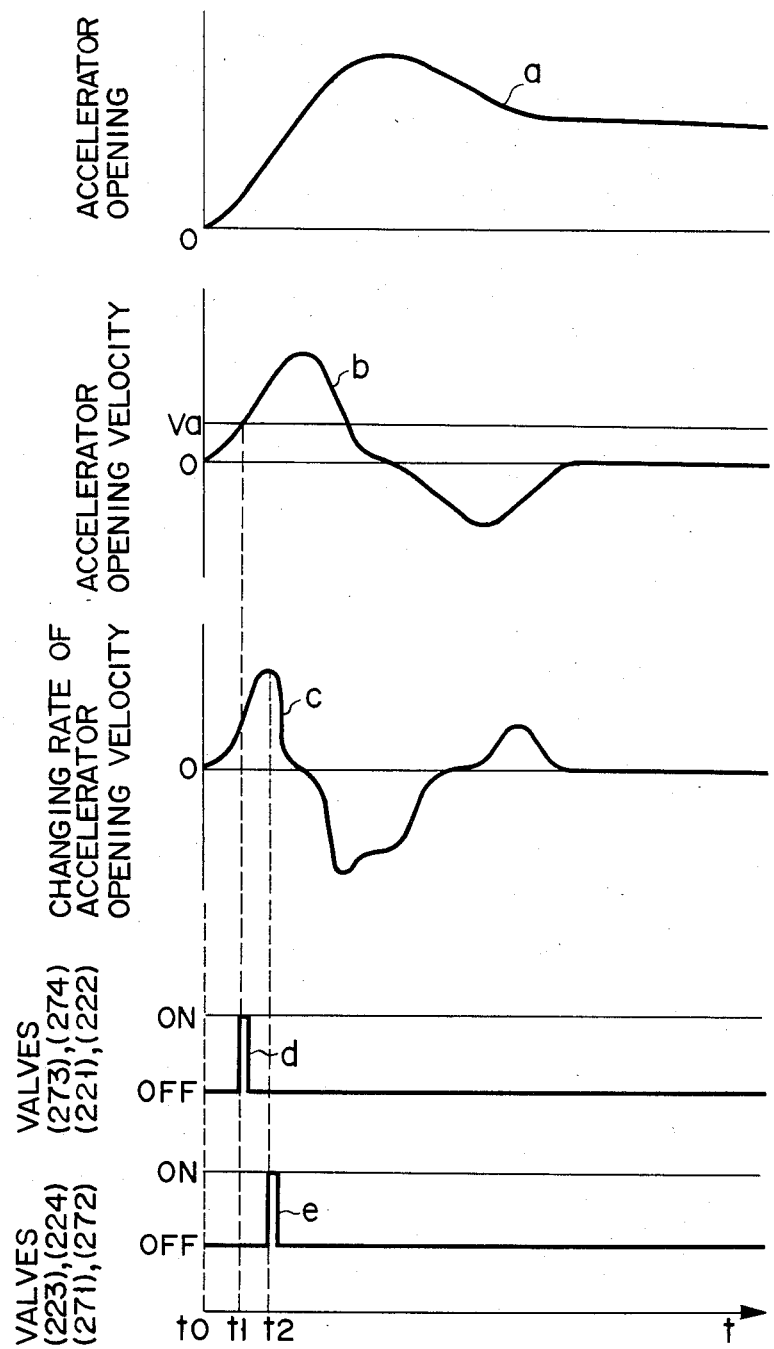
FIG. 6 shows an accelerator pedal depression pattern.

Referring to FIG. 6, a represents an accelerator pedal depression degree, b represents an accelerator pedal depression velocity, c represents a rate of change in accelerator pedal depression velocity, d represents an opening/closing state of the valves 273, 274, 221 and 222 and e represents an opening/closing state of the valves 223, 224, 271 and 272.

Assume that a driver sets a gear position in the first gear position by a shift lever and depresses the accelerator pedal at time t0. When the accelerator pedal depression velocity exceeds Va m/s at time t1, the valves 273, 274, 221 and 222 are opened (ON) for a predetermined period of time and are then closed (OFF). Thereafter, when the rate of change in accelerator pedal depression velocity is decreased at time t2, the valves 223, 224, 271 and 272 are opened (ON) for a predetermined period of time and are then closed (OFF).

According to the first embodiment described above, when a large acceleration acts along the longitudinal direction of the vehicle body, the compressed air is exhausted from the front wheel air springs 10 and is supplied to the rear wheel air springs 10 at an optimal timing for preventing squatting in which the front portion of the vehicle body floats. Therefore, the squat effect can be minimized. When acceleration is decreased, the compressed air is supplied to the front wheel air springs and is exhausted from the rear wheel air springs for a predetermined period of time. Therefore, when acceleration is low, the pressures of the front and rear air springs 10 are substantially restored.

According to the first embodiment, especially, restoration mode control is performed when decrease in the rate of change in accelerator pedal depression velocity is detected, as is apparent from step S8 of FIG. 5. Therefore, the restoration operation can be performed at optimal timing when acceleration acting on the vehicle body is being decreased, so that passengers will not feel discomfort.

In the first embodiment shown in FIG. 5, the controller 36 checks in step S8 whether or not the rate of change in accelerator pedal depression velocity is decreased. However, the controller 36 can also check whether or not the accelerator pedal depression velocity is decreased.

Figure 7:
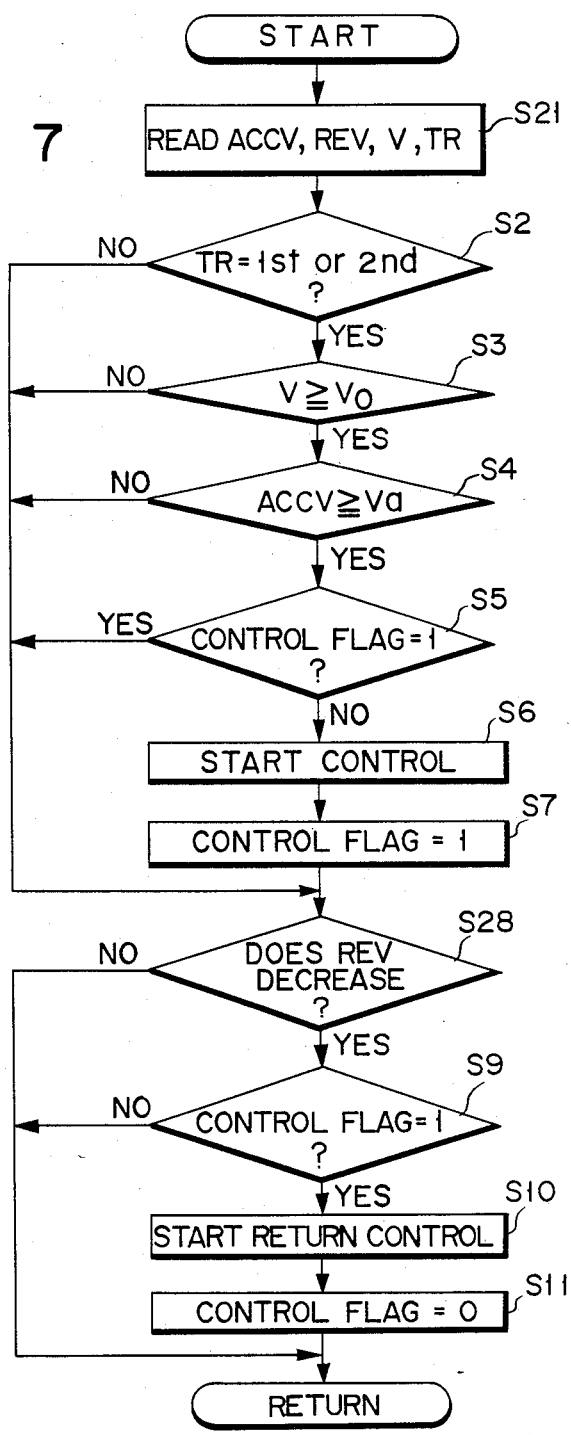
FIG. 7 is a flow chart for explaining the operation of a second embodiment of the present invention.

FIG. 7 is a flow chart for explaining a second embodiment. The second embodiment is substantially the same as the first embodiment, except that steps S21 and 28 are adapted in place of steps S1 and S8 of the first embodiment. The same steps as in the second embodiment denote the same operations as in the first embodiment.

In step S21, data are fetched by the controller 36 from the sensors 49, 50, 52 and 41 to store the accelerator pedal depression velocity ACCV, the engine speed REV, the vehicle velocity V and the gear position TR in the memory. The controller 36 checks in step S28 whether or not the engine speed is decreased. In other words, the decision block of step S28 is performed to determine whether or not the holding mode of the position control is set to the return mode.

According to the second embodiment described above, when a large acceleration acts along the longitudinal direction of the vehicle body, the compressed air is exhausted from the front wheel air springs 10 and is supplied to the rear wheel air springs 10 at an optimal timing for preventing squatting in which the front portion of the vehicle body floats. Therefore, the squat effect can be minimized. When acceleration is decreased, the compressed air is supplied to the front wheel air springs and is exhausted from the rear wheel air springs for a predetermined period of time. Therefore, when acceleration is low, pressures of the front and rear air springs 10 are substantially equalized.

According to the second embodiment, especially, restoration mode is set upon detection of a decrease in engine speed, as is apparent from step S28 of FIG. 7. Therefore, the restoration mode can be set at an optimal timing when acceleration of the vehicle body begins to decrease.

Figure 8:
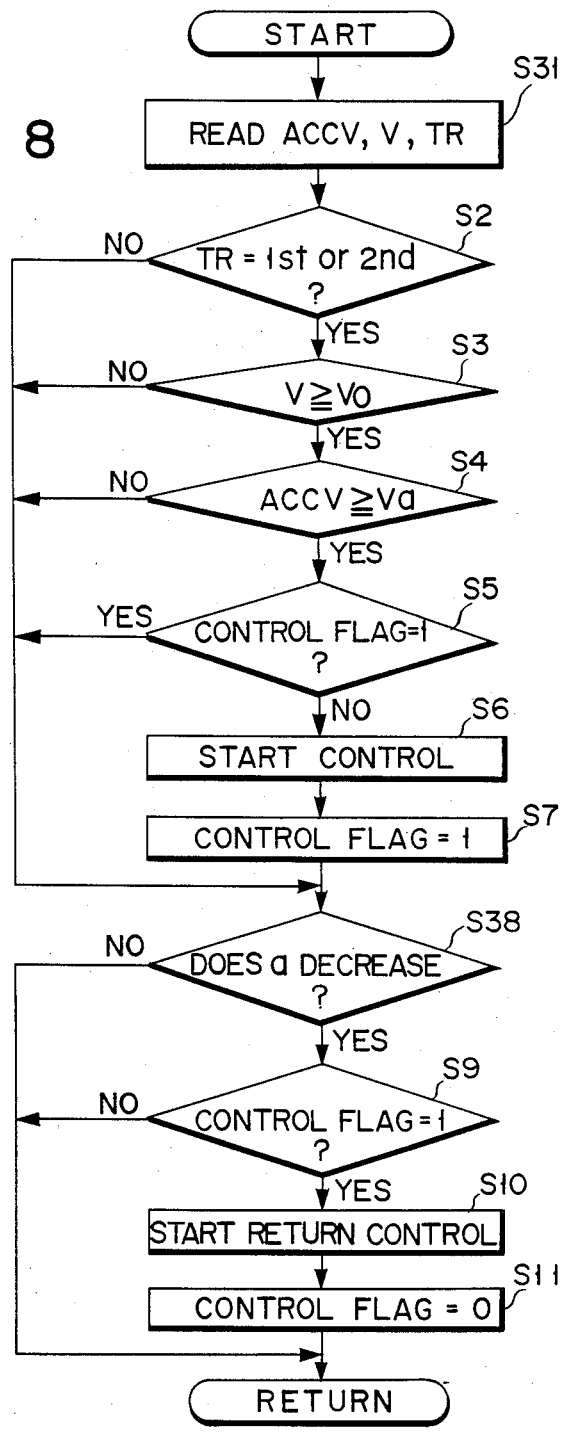
FIG. 8 is a flow chart for explaining the operation of a third embodiment of the present invention.

FIG. 8 is a flow chart for explaining the operation of a third embodiment. The third embodiment is substantially the same as the first embodiment, except that steps S31 and S38 are replaced with steps S1 and S8 of the first embodiment, respectively. The same steps as in the third embodiment denote the same operations as in the first embodiment.

In step S31, data are fetched by the controller 36 from the sensors 49, 52 and 41 to store the accelerator pedal depression velocity ACCV, the vehicle velocity V and the gear position TR. The controller 36 checks in step S38 whether or not a rate of change in vehicle velocity is decreased. In other words, this decision block is performed to determine whether or not the holding mode of the position control is to be replaced by the return mode thereof.

According to the third embodiment described above, when a large acceleration acts along the longitudinal direction of the vehicle body, the compressed air is exhausted from the front wheel air springs 10 and is supplied to the rear wheel air springs 10 at an optimal timing for preventing squatting by which the front portion of the vehicle body floats. Therefore, the squat effect can be minimized. When acceleration is decreased, the compressed air is supplied to the front wheel air springs 10 and is exhausted from the rear wheel air springs 10 for a predetermined period of time. Therefore, when acceleration is low, the pressures of the front and rear air springs 10 are substantially restored.

According to the third embodiment, especially, the return mode is set upon detection of the rate of change in vehicle velocity, as is apparent from step S38 of FIG. 8. Therefore, the return mode is set at an optimal timing when acceleration a acting on the vehicle body begins to decrease.

Figure 9:
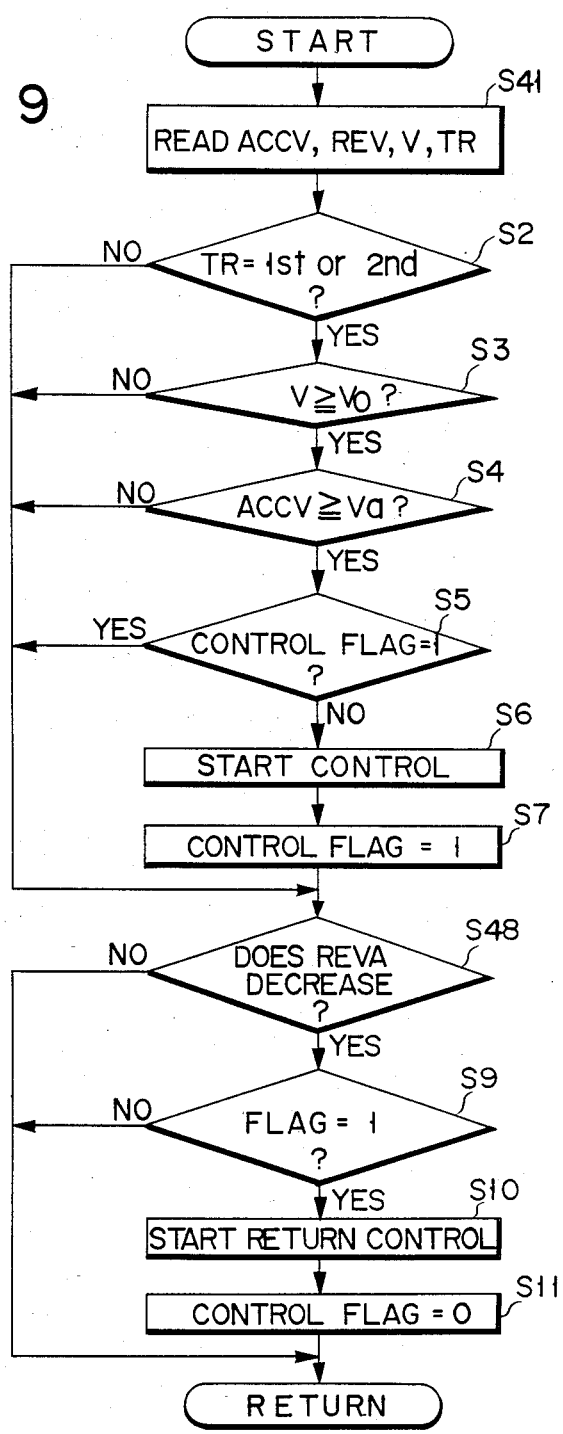
FIG. 9 is a flow chart for explaining the operation of a fourth embodiment of the present invention.

FIG. 9 is a flow chart for explaining the operation of a fourth embodiment. The fourth embodiment is substantially the same as the first embodiment, except that steps S41 and S48 are replaced with steps S1 and S8 of the first embodiment, respectively. The same steps as in the fourth embodiment denote the same operations as in the first embodiment.

In step S41, data are fetched by the controller 36 from the sensors 49, 50, 52 and 41 to store the accelerator pedal depression velocity, the rate of change in engine speed, the vehicle velocity and the gear position in the memory. The controller 36 checks in step S48 whether or not the rate of change REVA in engine speed is decreased. In other words, the decision block is performed to determine that the holding mode of the posture control is switched to the return mode thereof.

According to the fourth embodiment described above, when a large acceleration acts along the longitudinal direction of the vehicle body, the compressed air is exhausted from the front wheel air springs 10 and is supplied to the rear wheel air springs 10 at an optimal timing for preventing squatting by which the front portion of the vehicle body floats. Therefore, the squat effect can be minimized. When acceleration is decreased, the compressed air is supplied to the front wheel air springs 10 and is exhausted from the rear wheel air springs 10 for a predetermined period of time. Therefore, when acceleration is low, the pressures of the front and rear air springs 10 are substantially restored.

According to the fourth embodiment, especially, the restoration mode is set upon detection of the rate of change in engine speed, as is apparent from step S48 of FIG. 8. Therefore, the restoration mode is set at an optimal timing when acceleration acting on the vehicle body begins to decrease.

Figure 10:
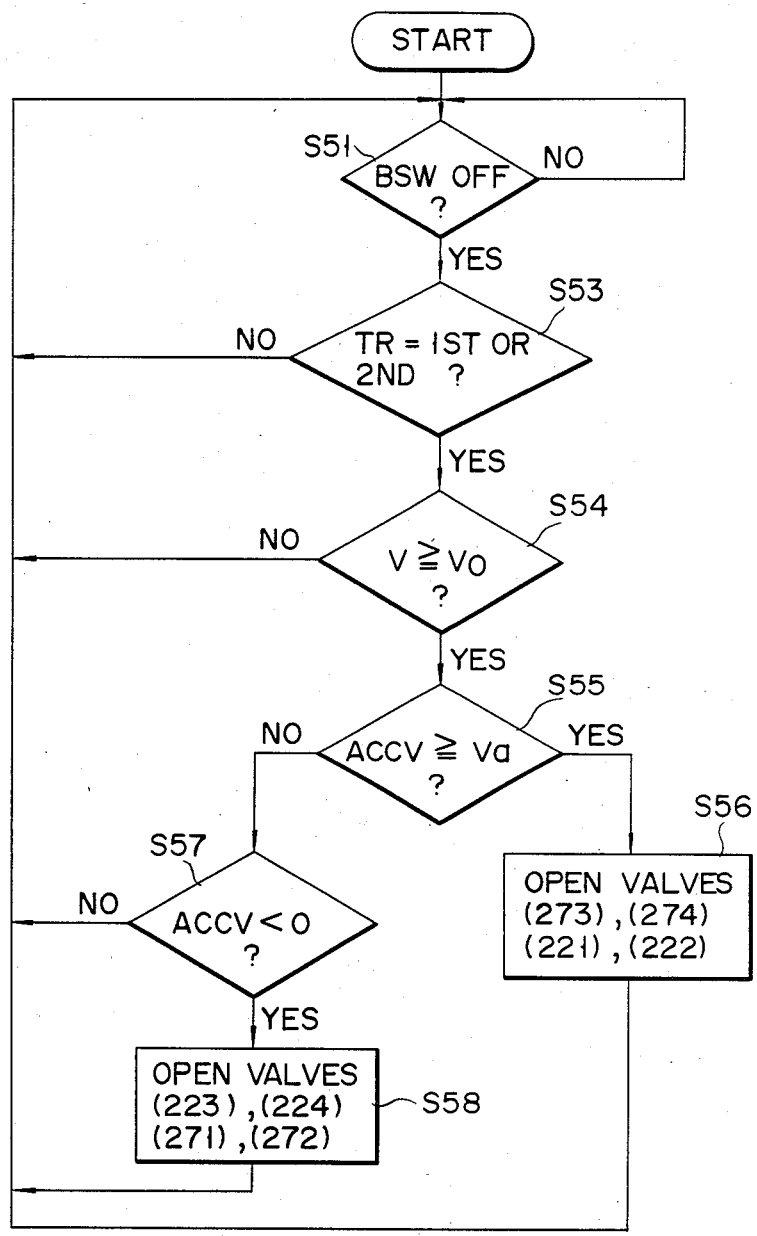
FIG. 10 is a flow chart for explaining the operation of a fifth embodiment of the present invention.

FIG. 10 is a flow chart for explaining the operation of a fifth embodiment. When the engine switch 51 is turned on, the following operations are performed. The controller 36 checks in step S51 whether or not the brake mechanism is being operated in accordance with the signal detected by the sensor 48. If NO in step S51 no rapid acceleration is performed, and the flow returns to step S51. However, if YES in step S51, the flow advances to step S53.

The controller 36 checks in step S53 whether or not the gear position is a low-speed position such as the first or second gear position in accordance with the signal detected by the sensor 52. When the gear position is not set in the low-speed gear position, no position control is required. If YES in step S53, the flow advances to step S54.

The controller 36 checks in step S54 whether or not the vehicle velocity detected by the sensor 41 exceeds V0 km/h (e.g., 3 km/h). This decision block is performed on the assumption that the driver may often depress the accelerator pedal at the first gear position while the clutch pedal is depressed so that position control is undesirably started although a change in vehicle position does not occur. If NO in step S54, the flow returns to step S51. However, if YES in step S54, the flow advances to step S55.

The controller 36 checks in step S55 whether or not the accelerator pedal depression velocity exceeds a preset value Va m/s (e.g., 0.2 m/s) in accordance with the output from the sensor 49. This decision block is performed because position control need not be performed when the accelerator pedal depression velocity is less than 0.2 m/s and an acceleration along the longitudinal direction of the vehicle body is not produced. The preset value Va (m/s) varies in accordance with type of vehicle and delay times of the solenoid valves. Therefore, the preset value is properly determined to match a timing at which the maximum acceleration act on the vehicle body with a timing at which a restoration force acts on the vehicle body in position control.

If YES in step S55, the flow advances to step S56. In step S56, the valves 273, 274, 221 and 222 are opened for a predetermined period of time, thereby reducing a change in position during rapid acceleration. Thereafter, when the acceleration is decreased, i.e., when the accelerator pedal depression velocity is decreased, step S55 is determined to be NO, and the flow advances to step S57.

The controller 36 checks in step S57 whether or not the accelerator pedal depression velocity calculated by the signal generated from the sensor 49 is negative, i.e., whether the accelerator pedal is being returned. If NO in step S57, the controller 36 determines that the acceleration is not yet decreased, and the flow returns to step S51. However, if YES in step S57, the flow advances to step S58 wherein the valves 223, 224, 271 and 272 are opened for a predetermined period of time. In the fifth embodiment, the valves 30 and 32 are kept closed.

According to the fifth embodiment described above, when a large acceleration acts along the longitudinal direction of the vehicle body, the compressed air is exhausted from the front wheel air springs 10 and is supplied to the rear wheel air springs 10 at an optimal timing to prevent squatting in which the front portion of the vehicle body floats. Therefore, the squat effect can be minimized. When the acceleration is decreased, the compressed air is supplied to the front wheel air springs and is exchausted from the rear wheel air springs for a predetermined period of time. Therefore, when the acceleration is low, the pressures of the front and rear air springs 10 are substantially restored.

According to the fifth embodiment, especially, the return mode is set when the controller 36 detects that the accelerator pedal is being released, as is apparent from step S48 of FIG. 8. Therefore, the return mode is set at an optimal timing when the acceleration acting on the vehicle body begins to decrease.

Figure 11:
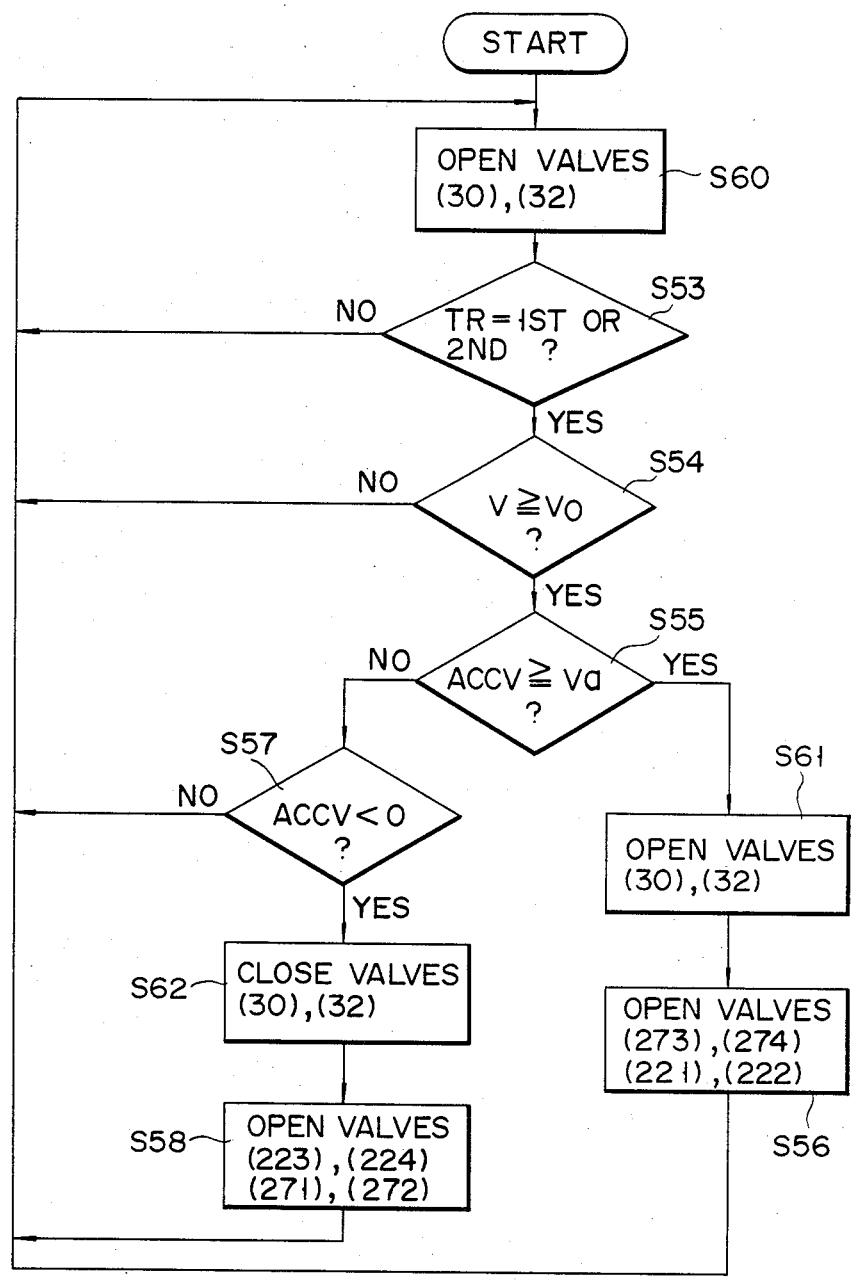
FIG. 11 is a flow chart for explaining the operation of a sixth embodiment of the present invention.

FIG. 11 is a flow chart for explaining a sixth embodiment of the present invention. The sixth embodiment is substantially the same as the fifth embodiment, except that step S51 of the fifth embodiment is omitted, and steps S60, S61 and S62 are added before steps S53, S56 and S58, respectively.

In steps S60 and 61, the valves 30 and 32 are opened. If these valves have already been opened, the controller 36 checks that they are opened. The valves 30 and 32 are closed in step S62.

The same effect as in the fifth embodiment can be obtained by the sixth embodiment.

Furthermore, according to the sixth embodiment, slow return control can be performed in the same manner as in the first to fourth embodiments, so that passengers will not feel discomfort.

Figure 12:
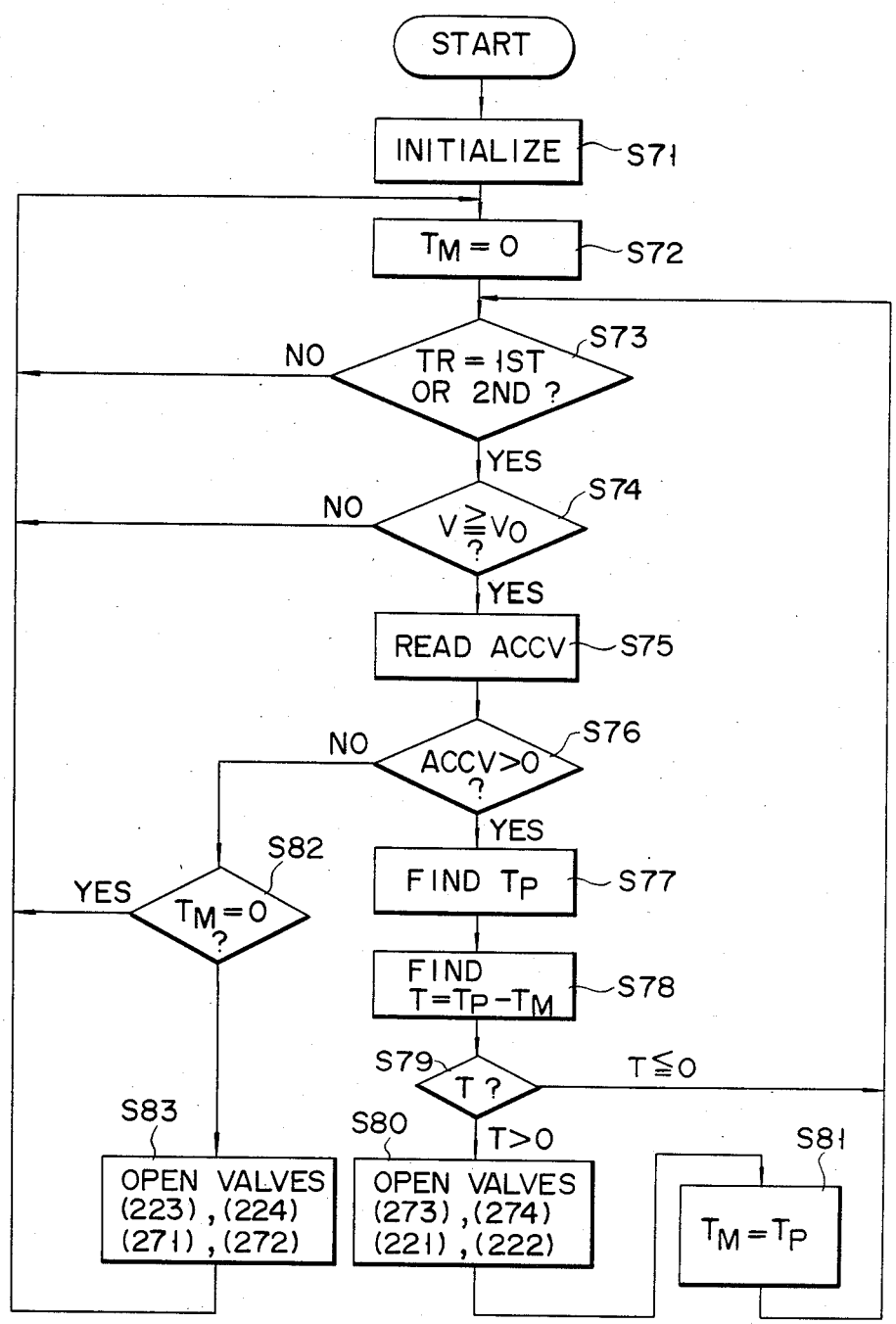
FIG. 12 is a flow chart for explaining the operation of a seventh embodiment of the present invention.

FIG. 12 is a flow chart for explaining the operation of the seventh embodiment.

When the engine switch 51 is turned on, the accelerator pedal depression velocity stored in a predetermined memory area in the controller 36 is cleared in step S71. In step S72, a map memory $T_M$ is reset. The controller 36 then checks in step S73 whether or not the gear position is set in a low-speed position such as first or second gear position. If YES in step S73, the flow advances to step S74. The controller 36 checks in step S74 whether or not the vehicle velocity detected by the sensor 41 exceeds the preset value V0 km/h (e.g., 3 km/h). These decision blocks are performed for the same reason as in the previous embodiments. In step S75, a change in accelerator pedal depression is a function of time, that is, the accelerator pedal depression velocity is calculated by using the output from the sensor 49.

The controller 36 checks in step S76 whether or not the accelerator pedal is gradually depressed, i.e., the throttle valve is gradually opened. If YES in step S76, the flow advances to step S77. A valve control time Tp is calculated in accordance with the accelerator pedal depression velocity Va (m/sec) shown in the accelerator pedal depression velocity map of FIG. 13. In this map, the control times satisfy condition T1<T2<T3. When the valve control time Tp is derived in step S77, the flow advances to step S78, and the valve opening time T ($=Tp-T_M$) is calculated.

The controller 36 checks in step S79 whether or not the valve opening time T is larger than zero. When the controller 36 checks in step S79 that condition T<0 is established, the flow returns to step S73. However, when the controller 36 determines that condition T>0 is established, the flow advances to step S80. In step S80, the controller 36 generates an instruction to open the valves 273, 274, 221 and 222 for the valve opening time T. In step S81, the map memory is updated ($T_M=Tp$), and the flow returns to step S73. If YES in step S76, the time Tp is read out from the map memory in step S77. The difference between the readout time and the time instructed in step S78 is calculated. If the controller 36 determines in step S79 that condition T>0 is established, an additional opening time is required. In step S80, the additional opening time is instructed. Even after the valve opening time is determined, the additional control time can be used to optimize the control operation.

If NO in step S76, i.e., when the controller 36 determines that the accelerator pedal is being released in accordance with the detection signal from the sensor 49 after posture control is performed in step S80, the flow advances to step S82. The controller 36 checks in step S82 whether or not condition $T_M=0$ is established. In this case, when the position control instruction is already generated in step S80, the control time is stored in step S81. Since NO in step S82, the flow advances to step S83. In step S83, the valves 223, 224, 271 and 272 are opened for the control time $T_M$ stored in the map memory. In this manner, return control is performed for the total control time designated in step S80.

The same effect as in the embodiments described above can be obtained in the seventh embodiment.

Furthermore, according to the seventh embodiment, position control can be performed for a control time corresponding to the accelerator pedal depression velocity by using the accelerator pedal depression velocity map in FIG. 13.

When a control instruction is generated in steps S80 and S83, the valves 30 and 32 can be simultaneously opened.

Figure 14A:
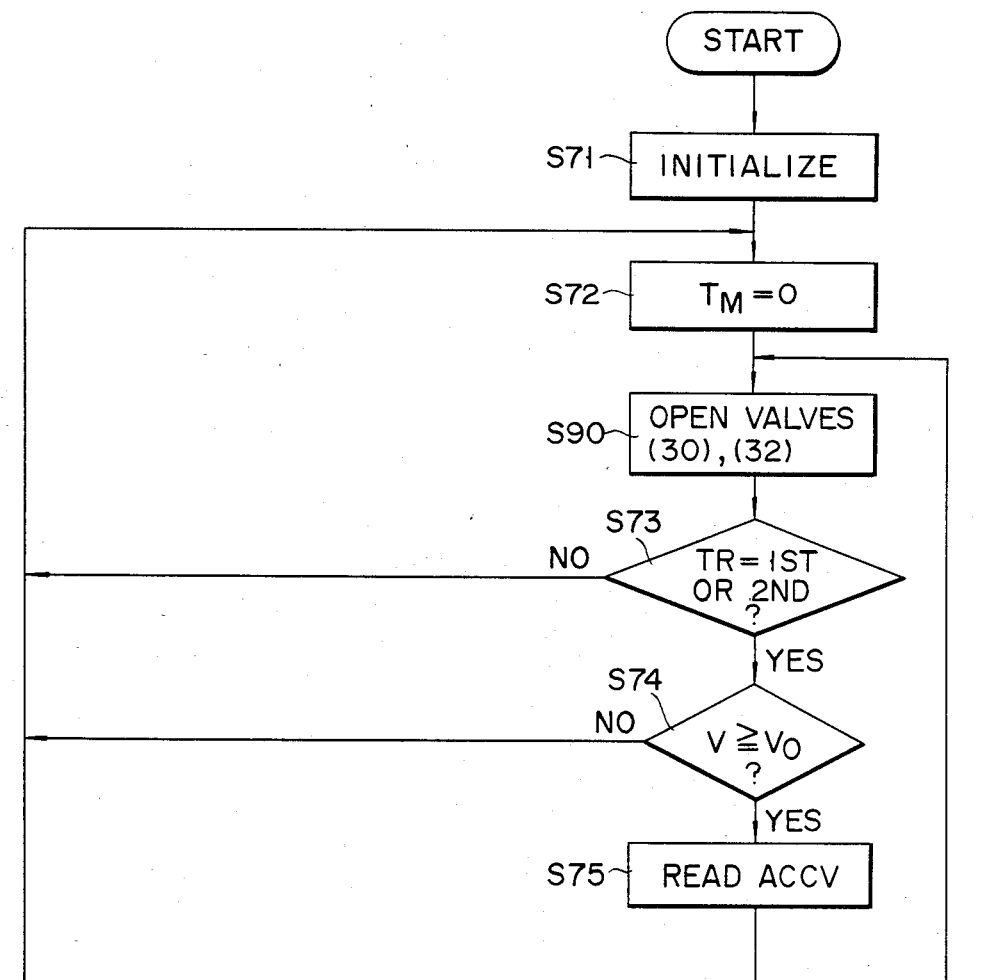
FIGS. 14A and 14B are flow charts for explaining the operation of an eighth embodiment of the present invention.
Figure 14B:
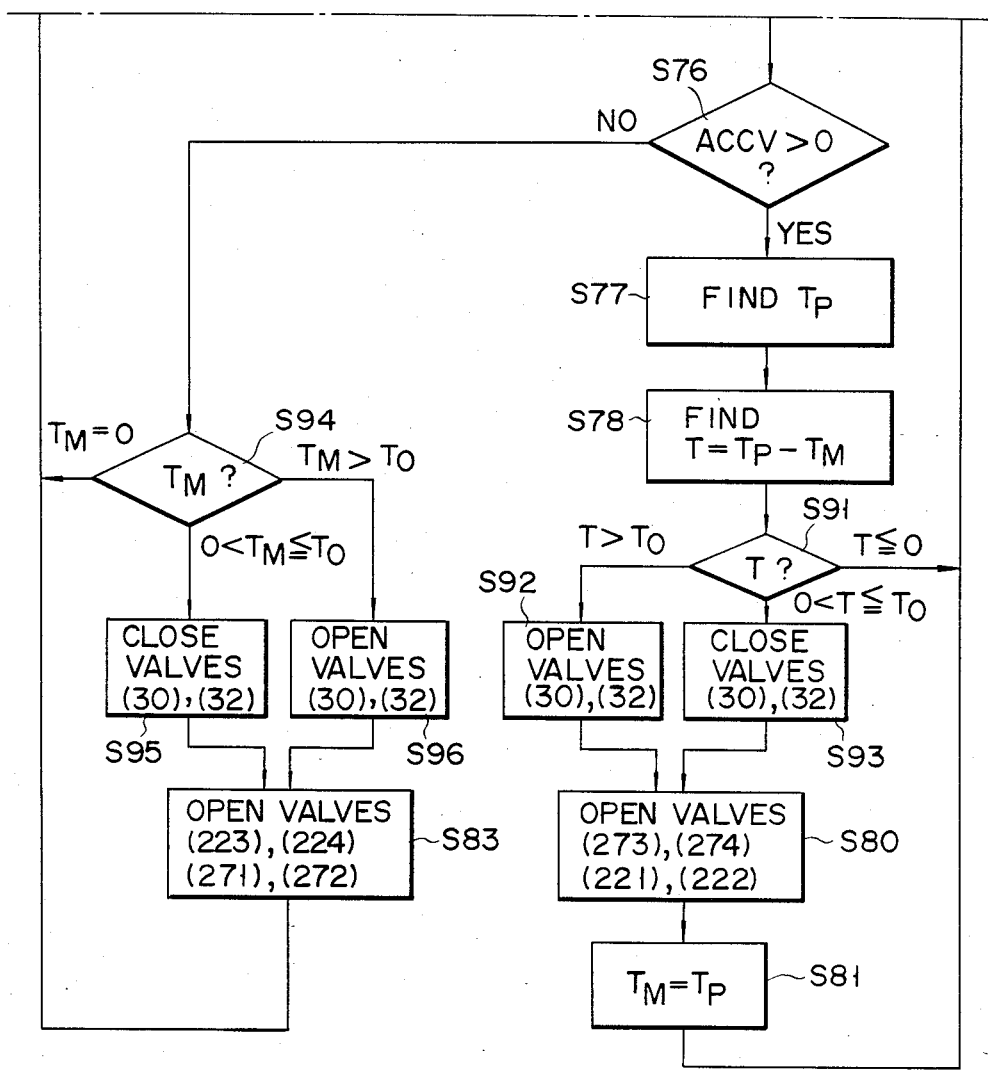

FIGS. 14A and 14B are flow charts for explaining an eighth embodiment of the present invention. The same steps in the eight embodiment denote the same operations as in the seventh embodiment shown in FIG. 12.

When the engine switch 51 is turned on, the same operations as in stpes S71 and S72 of the seventh embodiment are performed. Subsequently, the flow advances to step S90. In step S90, the valves 30 and 32 are opened. When they have already been opened, the controller 36 checks that they are open. The same operations as in the seventh embodiment are performed in steps S73 to S78 The controller 36 checks in step S91 whether the control time T calculated in step S78 satisfies condition T>TO, 0<T≤TO or T≤0. The preset time TO is set as follows. When the control time T is longer than the preset time TO, the valves 30 and 32 are preferably opened to immediately perform position control. However, when the control time T is shorter than the preset time TO, the valves 30 and 32 are preferably closed to perform slow position control.

When the controller 36 determines in step S91 that condition T>TO is established, the flow advances to step S92 to open the valves 30 and 32. Thereafter, the flow advances to step S80. When these valves have already been opened in step S95, the controller 36 checks that they are open. The same operation as in the seventh embodiment is performed in step S80, and the flow advances to step S81.

When the controller 36 determines in step S91 that condition 0<T<TO is established, the flow advances to step S93 to close the valves 30 and 32. Thereafter, the flow advances to step S80.

When the controller 36 determines in step S91 that condition T<0 is established, the flow returns to step S90.

The valve 30 or 32 can be selected in accordance with the required control time T.

If NO in step S76, i.e., when the controller 36 determines that the the accelerator pedal is being released in accordance with the signal from the sensor 49, after position control is performed in step S80, the flow advances to step S94. The controller 36 checks in step S94 whether the control time $T_M$ updated in step S81 satisfies condition $T_M$>TO, 0<$T_M$≦TO or $T_M$=0. The preset time TO is set in the same manner as in step S91. That is, when the control time $T_M$ is longer than the preset time TO, the valves 30 and 32 are preferably opened to immediately perform position control. However, when the control time $T_M$ is shorter than the preset time TO, the valves 30 and 32 are preferably closed to perform slow position control.

When the controller 36 determines in step S94 that condition $T_M$=0 is established, the flow returns to step S72 since position control in step S80 is not performed or the flow is ended.

When the controller 36 determines in step S94 that condition 0<$T_M$<TO is established, the flow advances to step S95 to close the valves 30 and 32. Thereafter, the flow advances to step S83. The same operation as in the seventh embodiment is performed in step S83, and the flow returns to step S72.

When the controller 36 determines in step S94 that condition $T_M$>TO is established, the flow advances to step S96 to open the valves 30 and 32. Thereafter, the flow advances to step S83. When the valves 30 and 32 have already been opened, the controller 36 checks that they are open.

The same position control as in the above-mentioned embodiments during rapid acceleration can be performed in the eighth embodiment.

Furthermore, according to the eighth embodiment, as is apparent from steps S91 and S94 in FIG. 14, the valves 30 and 32 are opened for the control time, thereby performing the position control operations for the optimal time.

Figure 15:
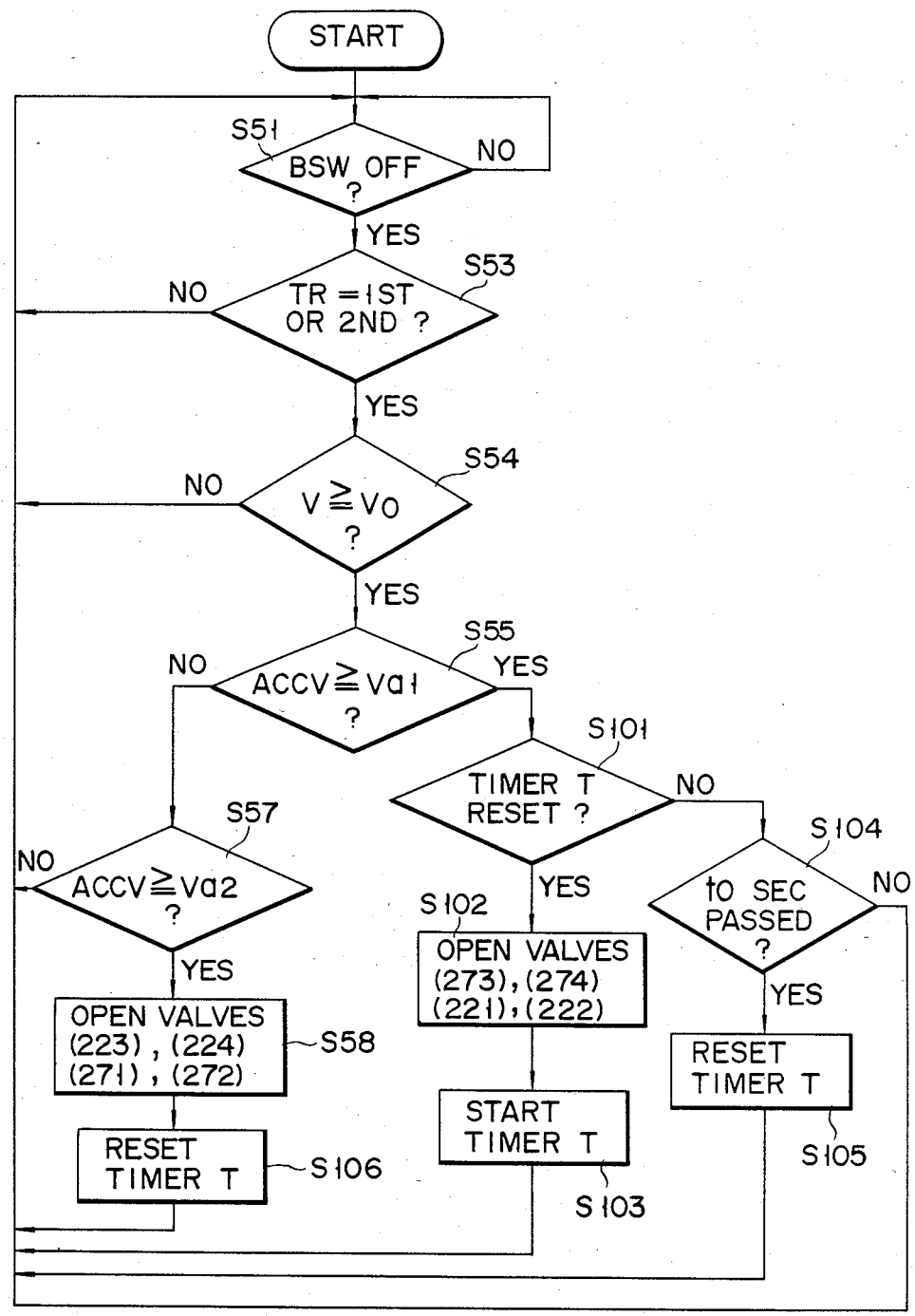
FIG. 15 is a flow chart for explaining the operation of a ninth embodiment of the present invention.

FIG. 15 is a flow chart for explaining the operation of a ninth embodiment of the present invention. The ninth embodiment is substantially the same as the fifth embodiment of FIG. 10, except that steps S101, S102, 103, 104 and 105 are used in place of step S56 of FIG. 10, and step S106 is added after step S58 of FIG. 10. The same steps in the ninth embodiment denote the same operations as in the fifth embodiment.

If YES in step S55, i.e., when the controller 36 determines that the accelerator pedal depression velocity exceeds Va1, the flow advances to step S101. The controller 36 checks in step S101 whether or not a tO timer T is reset. If YES in step S101, the flow advances to step S102 to open the valves 273, 274, 221 and 222 for a predetermined period of time. In step S103, the tO timer is started. However, if NO in step S101, the flow advances to step S104 to check whether or not tO seconds have elapsed. If YES in step S104, the flow advances step S105 to reset the tO timer. If NO in step S104, the flow returns to step S51.

However, if YES in step S57, the valves 223, 224, 271 and 272 are opened for the predetermined period of time in step S58, thereby performing the restoration operation. Subsequently, the flow advances to step S106. The tO timer T is reset in step S106.

The same effect as in the fifth embodiment can be obtained in the ninth embodiment.

Furthermore, according to the ninth embodiment, if NO in step S101 (i.e., when the controller 36 determines that the tO timer is not reset) even if YES in step S55, position control is not performed, thereby providing the following effect. When the tO seconds have not elapsed after position control is started, or when th return mode is not set, position control is not performed even if position control is appropriate. Therefore, position control will not be performed a plurality of times even if rapid acceleration for a relatively long period of time is detected.

Figure 16:
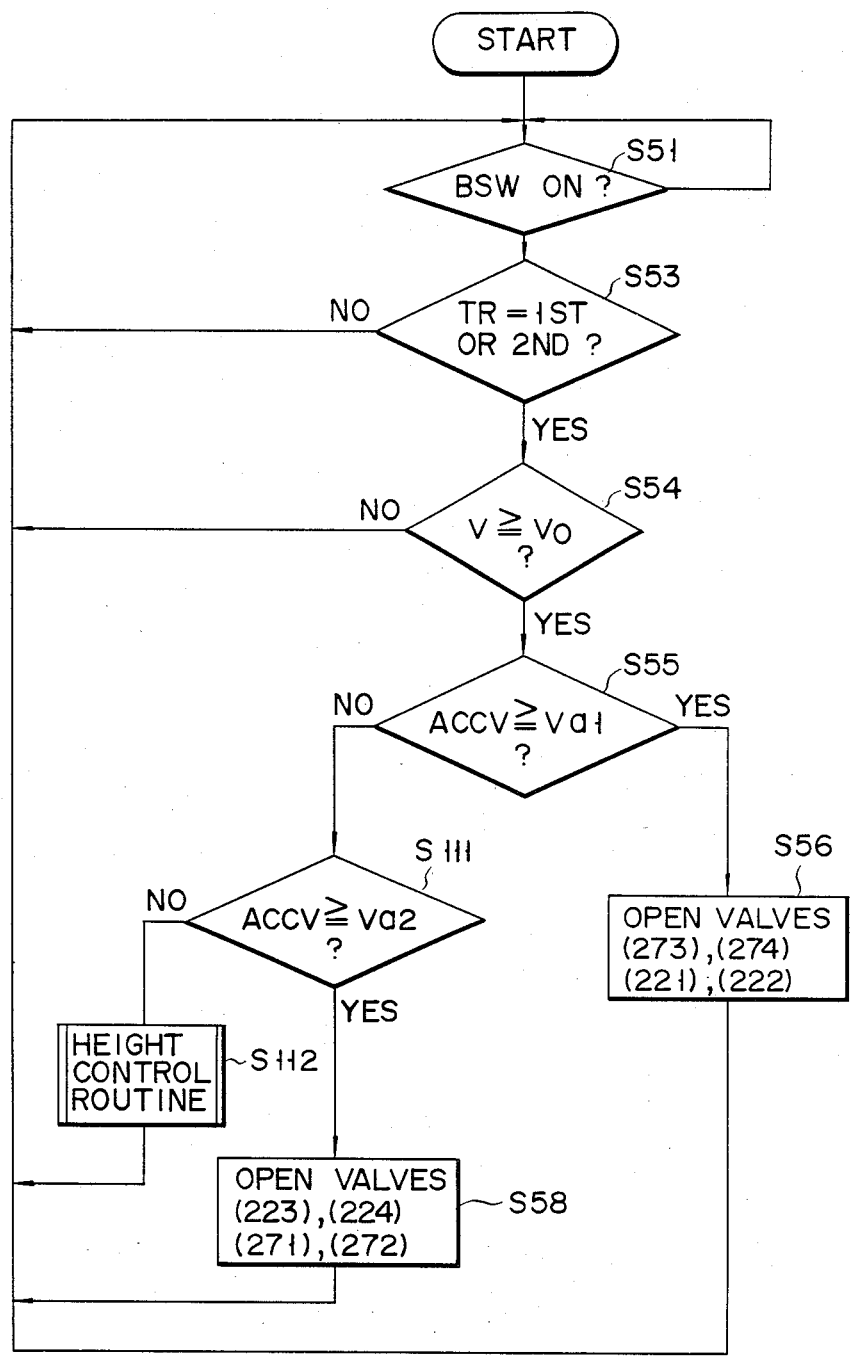
FIG. 16 is a flow chart for explaining the operation of a tenth embodiment of the present invention.

FIG. 16 is a flow chart for explaining the operation of a tenth embodiment. The tenth embodiment is substantially the same as the fifth embodiment of FIG. 10, except that steps S111 and S112 replace step S57 of the fifth embodiment. The same steps in the tenth embodiment denote the same operations as in the fifth embodiment.

If NO in step S55, i.e., when the controller 36 determines that the acceleration is decreased after position control in step S56 is performed, the flow advances to step S111. The controller 36 checks in step S111 whether or not the accelerator pedal release velocity exceeds Va2 m/s. It should be noted that the preset value Va2 m/s is determined to set the restoration mode of position control when the accelerator pedal is released at a velocity larger than the preset value Va2 m/s. If YES in step S111, the flow advances to step S58 to start return operation. However, if NO in step S111, the return operation can be slowly performed, so that the flow advances to step S112 to perform position restoration control by the control routine for height control.

The same effect as in the fifth embodiment is obtained in the tenth embodiment.

Furthermore, the return control operation is performed slowly when the accelerator pedal is slowly released, so that passengers will not feel discomfort.

In each flow chart of the above embodiments, the decision block is provided to determine whether or not the vehicle velocity exceeds V0 km/h. This prevents unnecessary position control even if the driver races the engine, i.e., even if the driver depresses the accelerator pedal at the first gear position while the clutch pedal is being depressed in the manual transmission vehicle. Instead of this decision block, a step can be provided to determine whether or not the clutch is connected.

In an automatic transmission vehicle, when the shift lever is set in the first or second gear position, a fluid coupler corresponding to the clutch is always connected. In this case, when the accelerator pedal is rapdly depressed, a rapid acceleration is produced. Therefore, the decision block for determining whether or not the vehicle velocity exceeds V0 km/h is omitted.

In the respective embodiments, the suspension apparatus has air springs. However, the present invention can also be applied to a suspension apparatus of a hydropneumatic type.

What is claimed is:

1. A vehicle suspension apparatus comprising: front and rear wheel suspension units arranged at wheel positions and having fluid spring chambers, respectively; fluid supply means for supplying a fluid to said fluid spring chambers in said front and rear wheel suspension units, respectively, through front and rear wheel fluid supply valves; fluid exhaust means for exhausting the fluid from said fluid spring chambers in said front and rear wheel suspension units, respectively, through front and rear wheel suspension units, respectively, through front and rear wheel fluid exhaust valves; position control means for controlling said front and rear wheel fluid supply valves and said front and rear wheel fluid exhaust valves; an accelerator pedal sensor for detecting a state of an accelerator pedal of a vehicle engine and supplying a detection signal to said position control means; and a gear position sensor for detecting a gear change position of a transmission of a vehicle and supplying a detection signal to said position control means, wherein said position control means supplies a control start signal to open said front wheel fluid exhaust valves and said rear wheel fluid supply valves for a predetermined period of time when a rapid acceleration of the vehicle is detected by said accelerator pedal sensor and said gear position sensor.

2. An apparatus according to claim 1, wherein said position control means generates the control start signal when said accelerator pedal sensor detects that an accelerator pedal depression velocity exceeds a preset value and said gear position sensor detects that a gear position is set in a low-speed gear position.

3. An apparatus according to claim 1, wherein said position control means determines the predetermined period of time corresponding to an accelerator pedal depression velocity detected by said accelerator pedal sensor upon generation of the control start signal.

4. An apparatus according to claim 1, wherein said position control means supplies a control restoration signal to open said front wheel fluid supply valves and said rear wheel fluid exhaust valves for the predetermined period of time after said front wheel exhaust valves and said rear wheel supply valves are opened for the predetermined period of time in response to the control start signal.

5. An apparatus according to claim 4, wherein said position control means generates the control restoration signal when the rapid acceleration is decreased in accordance with the output from said accelerator pedal sensor.

6. An apparatus according to claim 5, wherein said position control means generates the control restoration signal when said accelerator pedal sensor detects that the accelerator pedal is gradually being released.

7. An apparatus according to claim 5, wherein said position control means generates the control restoration signal when said accelerator pedal sensor detects that the accelerator pedal release depression velocity is decreased.

8. An apparatus according to claim 4, further comprising a driving system rotational velocity sensor for detecting a rotational velocity of a driving system of the vehicle, and wherein said position control means generates the control restoration signal when said driving system rotational velocity sensor detects that the rapid acceleration of the vehicle is decreased.

9. An apparatus according to claim 8, wherein said driving system rotational sensor comprises a vehicle velocity sensor.

10. An apparatus according to claim 8, wherein said driving system rotational velocity sensor comprises an engine speed sensor.

11. An apparatus according to claim 8, wherein said position control means generates the control restoration signal when said driving system rotational velocity sensor detects that the rotational velocity of said driving system is decreased.

12. An apparatus according to claim 8, wherein said position control means generates the control restoration signal when said driving system rotational velocity sensor detects a decrease in a rate of change in the rotational velocity of said driving system.

13. An apparatus according to claim 4, wherein
said fluid supply means has a fluid supply channel selection valve for selecting one of large- and small-diameter paths for supplying the fluid to the respective fluid spring chambers;
said fluid exhaust means has a fluid exhaust channel selection valve for selecting one of large- and small-diameter paths for exhausting the fluid from the respective fluid spring chambers; and
said position control means controls said fluid supply and exhaust channel selection valves to select the large-diameter fluid supply and exhaust paths for said fluid supply and exhaust means when the control start signal is generated, and to select the small-diameter fluid supply and exhaust paths when the control restoration signal is generated.

14. An apparatus according to claim 1, further comprising:
front and rear vehicle height sensors for detecting front and rear vehicle heights of a vehicle body of the vehicle, respectively; and
vehicle height control means for comparing signals from said front and rear vehicle height sensors with target vehicle height inputs and generating a vehicle height control signal to open/close said supply and exhaust valves so as to match the front and rear vehicle heights with the target vehicle heights.

15. An apparatus according to claim 14, wherein after said position control means generates the control start signal to open said front wheel fluid exhaust valves and said rear wheel fluid supply valves for the predetermined period of time, said position control means will not generate the control restoration signal, and said vehicle height control means restores a previous vehicle position.

16. An apparatus according to claim 14, wherein, after said position control means generates the control start signal to open said front wheel fluid exhaust valves and said rear wheel fluid supply valves for the predetermined period of time, said position control means generates the control restoration signal when said accelerator pedal sensor detects that an accelerator pedal release velocity exceeds a predetermined value, and said position control means will not generate the control restoration signal when the accelerator pedal release velocity is less than the predetermined value, thereby causing said vehicle height control means to restore the vehicle position.

17. An apparatus according to claim 14, wherein
said fluid supply means has a fluid supply channel selection valve for selecting one of large- and small-diameter paths for supplying the fluid to the respective fluid spring chambers;
said fluid exhaust means has a fluid exhaust channel selection valve for selecting one of large- and small-diameter paths for exhausting the fluid from the respective fluid spring chambers; and
said position control means controls said fluid supply and exhaust channel selection valves to select the large-diameter fluid supply and exhaust paths for said fluid supply and exhaust means when the control start signal is generated, and vehicle height control means controls said fluid supply and exhaust channel selection valves to select the small-diameter fluid supply and exhaust paths for said fluid supply and exhaust means when the vehicle height control signal is generated.

18. An apparatus according to claim 1, further comprising a driving system rotational velocity sensor for detecting a rotational velocity of a driving system of the vehicle, and wherein said position control means stops generating the control start signal when said driving system rotational velocity sensor detects that a rotational velocity of said driving system is less than a predetermined value.

19. An apparatus according to claim 18, wherein said driving system rotational velocity sensor comprises a vehicle velocity sensor.

20. An apparatus according to claim 18, wherein said driving system rotational velocity sensor comprises an engine speed sensor.

21. An apparatus according to claim 1, wherein said position control means will not generate the control start signal for a predetermined period of time upon generation of the control start signal even if said accelerator pedal sensor and said gear position sensor detect the rapid acceleration of the vehicle.

22. An apparatus according to claim 1, wherein said position control means comprises a controller with a microcomputer.

23. An apparatus according to claim 14, wherein said position control means and said vehicle height control means comprise a controller with a microcomputer.

24. A vehicle suspension apparatus comprising: front and rear wheel suspension units arranged at wheel positions and having air spring chambers, respectively; compressed air supply means for supplying compressed air to said air spring chambers in said front and rear wheel suspension units, respectively, through front and rear wheel compressed air supply valves; compressed air exhaust means for exhausting the compressed air from said air spring chambers in said front and rear wheel suspension units, respectively, through front and rear wheel compressed air exhaust valves; position control means for controlling said front and rear wheel compressed air suppy valves and said front and rear wheel compressed air exhaust valves; an accelerator pedal sensor for detecting a state of an accelerator pedal of a vehicle engine and supplying a detection signal to said position control means; and a gear position sensor for detecting a gear change position of a transmission of a vehicle and supplying a detection signal to said position control means, wherein said position control means supplies a control start signal to open said front wheel compressed air exhaust valves and said rear wheel compressed air supply valves for a predetermined period of time when a rapid acceleration of the vehicle is detected by said accelerator pedal sensor and said gear position sensor.

25. A hydropneumatic type vehicle suspension apparatus comprising: front and rear wheel suspension units arranged at wheel positions and havign fluid spring chambers, respectively; fluid supply means for supplying a fluid to said fluid spring chambers in siad front and rear wheel suspension units, respectively, through front and rear wheel fluid supply valves; fluid exhaust means for exhausting the fluid from said fluid spring chambers in said front and rear wheel suspension units, respectively, through front and rear wheel fluid exhaust valves; position control means for controlling said front and rear wheel fluid supply valves and said front and rear wheel fluid exhaust valves; an accelerator pedal sensor for detecting a state of an accelerator pedal of a vehicle engine and supplying a detection signal to said position control means; and a gear position sensor for detecting a gear change position of a transmission of a vehicle and supplying a detection signal to said position control means, wherein said position control means supplies a control start signal to open said front wheel fluid exhaust valves and said rear wheel fluid supply valves for a predetermined period of time when a rapid acceleration of the vehicle is detected by said accelerator pedal sensor and said gear position sensor.

* * * * *